United States Patent Office 3,424,767
Patented Jan. 28, 1969

3,424,767
SUBSTITUTED BENZOQUINONES AND THE
PREPARATION THEREOF
Kurt E. Burdeska, Basel, Jost von der Crone, Riehen,
Raphael Menassé, Basel, and André Pugin, Riehen,
Switzerland, assignors to J. R. Geigy A.G., Basel,
Switzerland
No Drawing. Continuation-in-part of application Ser. No.
252,591, Jan. 21, 1963. This application Jan. 16, 1964,
Ser. No. 338,006
Claims priority, application Switzerland, Jan. 25, 1962,
926/62; Sept. 6, 1962, 10,610/62; Jan. 16, 1963, 504/63;
July 23, 1963, 9,164/63
U.S. Cl. 260—396                                    12 Claims
Int. Cl. A61l *13/00;* A01m *21/00;* C07c *103/12*

This application is a continuation-in-part of our pending application Ser. No. 252,591 filed Jan. 21, 1963, now U.S. Patent No. 3,232,932.

The present invention relates to novel acylamino-1,4-benzoquinones which are useful, more especially, as intermediates in the production of dioxazines, and as fungicides.

Dioxazines, which have been used primarily as pigments, have been produced on an industrial scale from chloranil which is converted, for instance, to 2,5-dichloro-3,6-diamino-p-benzoquinone (J.A. Chem. Soc. 57, 1847 (1935)) and by acylation with an acylating agent such as acetic anhydride to the corresponding acylamino derivative; the latter is then further condensed and then cyclized with an aromatic amine, whereby the corresponding dioxazine is obtained. The known processes suffer from the drawbacks of relatively low overall yields, which are due to losses particularly in the initial stages of the process, and of relatively limited applicability with regard to the aforesaid acylation step; for instance, acylation with benzoic acid anhydride or chloride does not lead to industrially satisfactory results.

It is a primary object of the invention to provide novel intermediates which are useful in the production of dioxazines, and which are themselves useful as fungicides.

This object is attained by the process according to the invention, as illustrated in the flowsheet below, which process comprises the following steps:

(a) Mixing and heating at from about 30° to 250° C. a readily available starting compound of one of the formulae (Ia) 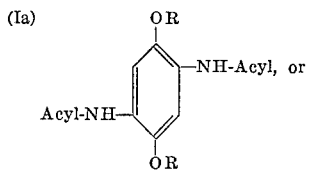   (Ib) 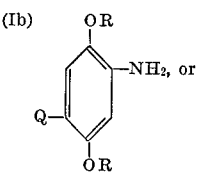

(Ic) 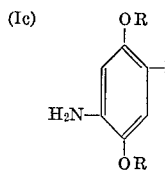

wherein
R is a lower alkyl, a benzyl or a phenyl radical,
Q is chlorine, bromine, or fluorine, a phenoxy or a lower alkoxy radical, and
acyl is an unsubstituted alkanoic acyl radical, a chloro-alkanoic acyl radical, a bromo-alkanoic acyl radical, an alkoxy-alkanoic acyl radical, a cyclo-alkanoic acyl radical, an aralkanoic acyl radical, a benzoic acyl radical, a naphthoic acyl radical, or an alkoxy carbonyl radical, with an acylating agent which is either a compound of the formula

or a compound of the formula acyl-Y
wherein
acyl has the above-given meaning, and
Y is chlorine or bromine,
and separating the resulting compound of the formula

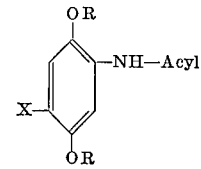                                                        (II)

wherein
X is a phenoxy, or lower alkoxy radical, —NH-acyl, chlorine, bromine or fluorine, depending on the nature of the starting material, and
R and Acyl have the aforesaid meanings, from the reaction mixture.

Step (a) is suitably carried out in an inert organic solvent, preferably an unsubstituted or halogenated aromatic hydrocarbon.

When step (a) is carried out with a mixture including a compound of the formula Acyl-Y, an acid binding agent is used which is preferably an alkali metal acetate or an alkaline earth metal oxide, carbonate or hydroxide.

More particularly, the intermediate compounds of Formula II can contain the following groups: as alkoxy substituents, methoxy, ethoxy, propoxy or butoxy groups; as aralkoxy substituents, benzyloxy groups; as phenoxy substituents, phenoxy groups which may be substituted in the nucleus such as phenoxy, methyl or halogenophenoxy groups.

Advantageously an acylamino-1,4-dialkoxybenzene having low alkoxy groups is used as intermediate II, particularly a dimethoxy- or diethoxy-acylaminobenzene compound.

Preferred intermediates II are 2,5-diacylamino-1,4-dialkoxybenzenes and 2-acylamino-5-halogen-1,4-dialkoxybenzenes. "Halogen" therein means, for example, bromine, fluorine or particularly chlorine. The acyl radical of the acylamino groups is derived, for example, from aliphatic carboxylic acids, more particularly unsubstituted alkanoic acids, preferably of not more than 18 carbon atoms, such as formic acid, acetic acid, propionic acid, butyric acid, valeric acid, caproic acid, caprylic acid, caprinic acid, lauric acid, palmitic acid or stearic acid, chloro- or bromo-substituted alkanoic acids of preferably not more than 4 carbon atoms, e.g., chloro- or bromo-acetic acid, α- or β-chloropropionic acid or α- or β-bromopropionic acid, alkoxy-substituted alkanoic acids in which alkoxy is preferably of 1 to 4 carbon atoms and the total number of carbon atoms of which does preferably not exceed 10 carbon atoms, methoxy- or ethoxy-acetic acid, from amino-alkanoic acids which may be N-, preferably lower alkyl or N-aryl-substituted, and the total number of carbon atoms of which does preferably not exceed 10 carbon atoms, aminoacetic acid, α- or β-aminopropionic acid, or N-phenyl-amino acetic acid, from an alkenoic acid of preferably not more than 5 carbon atoms, acrylic or methacrylic acid or from cycloalkanoic acids such as cyclohexane carboxylic acid, from aralkanoic and aralkenoic acids of preferably not more than 10 carbon atoms each, such as phenylacetic acid, α- or β-phenylpropionic acid, α-phenylacrylic acid or cinnamic acid, from aromatic carbocyclic carboxylic acids with preferably not more than 12 carbon atoms, such as benzoic acid, methyl-, chloro-, methoxy- or nitro-benzoic acids, α- or β-naphthoic acid, from aromatic heterocyclic carboxylic acids having preferably not more than 8 carbon atoms and nitrogen as hetero atom such as pyridine carboxylic acids; as an alkoxycarbonyl radical with preferably not more than 8, and most advantageously with from 4 to 6 carbon atoms, the said acyl radical is derived from monoesters of carbonic acid with alkanols or with polyalkylene glycol monoalkyl ethers, as a carbamyl radical with preferably not more than 9 carbon atoms, the said acyl radical is derived from carbamic or thiocarbamic acids such as methyl-, ethyl- or phenyl- or carbamic acid, or, as an alkyl sulfonyl or aryl sulfonyl radical with preferably not more than 10 carbon atoms, the said radical is derived from organic sulfonic acids such as methane-, ethane, benzene- or p-toluene-sulfonic acid or the said acyl radical is derived from cyclic carboxylic acids such as cyanuric acid or derivatives thereof, preferably 2,4-di- or 2,4,6-trichloro-s-triazine, 2,4,5,6-tetrachloro pyrimidine, or 2,3-dichloroquinoxaline.

The aforesaid intermediates II are obtained, for example, by acylating the corresponding amino-1,4-dialkyloxybenzene compounds with suitable acylating agents such as, with the halides or anhydrides of organic carboxylic acids, the halides of carbonic acid monoesters as well as the halides of organic sulfonic acids or with the halides of cyclic carbonic acid imides or with inner anhydrides such as ketenes or isocyanates.

(b) Mixing the recovered compound of Formula II in a liquid medium inert to oxidation with nitric acid having a strength of at least 0.5-normal, at a temperature of about 10° to 100° C., thereby oxidizing the last-mentioned compound to the corresponding quinone of the formula

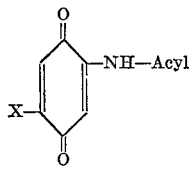

(III)

wherein Acyl and X have the aforesaid meanings, and separating the latter compound from the reaction mixture.

It is very surprising that this treatment, which can be effected successfully even with nitric acid of high concentration such as fuming nitric acid, affords an excellent oxidation with high yields of products of Formula III in which even highly susceptible radicals —NH-acyl are left intact. It becomes thus possible to subject compounds of Formula II with a large variety of substituents to this treatment of step (b), among which there are the benzoyl and other interesting radicals, leading to intermediates of Formula III which are themselves, or can, in turn, be converted by the next following step (c) to compounds which are surprisingly useful as fungicides.

It is especially surprising that, with the preferred oxidizing agent, nitric acid, the oxidation proceeds so easily with replacement of the ether groups by carbonyl oxygen without saponification of the acylamino groups and also that no other great changes are caused. The easy formation of 2,5-bis-acylamino-1,4-benzoquinones from 2,5-bis-acylamino-1,4-dialkoxy, -aralkoxy- and -phenoxy- benzenes is also surprising in view of the papers by Roger Adams and coworkers (see, e.g., J. Am Ch. Soc. 72 (1950) p. 4601, 5154) who have shown by many examples that in the oxidation of p-bis-acylamidobenzenes and p-bis-sulfamido-benzenes, the corresponding p-quinone acylimides or p-quinone sulfimides are formed which are capable of various addition reactions.

In some cases it is also possible to perform the oxidation and halogenation in one step by oxidizing in the presence of halogen hydracids such as hydrochloric or hydrobromic acids.

Both the above-described oxidation to form quinones and the subsequent halogenation thereof are advantageously performed in the presence of an inert organic solvent, and this independently of whether these two operations are performed in one or two steps. Suitable solvents are, for example, glacial acetic acid or aliphatic or aromatic hydrocarbons which may be halogenated such as chloroform, carbon tetrachloride, tetrachloroethane, chlorobenzenes or nitrobenzene.

Acylamino-1,4-benzoquinone compounds of the most various types are obtained by this step of the process according to the invention. Thus it is also possible to produce 2,5-diacylamino-1,4-benzoquinones the acyl radicals of which are unsymmetrically substituted.

The strength of the nitric acid used as oxidizing agent in this step (b) ranges preferably from 8-normal HNO₃ to fuming nitric acid, with 10-normal HNO₃ being most preferred. 3 to 4 moles of nitric acid are preferably used per mole of compound of Formula II.

Very satisfactory results are obtained, with almost theoretical yield rates, when using the last-mentioned nitric acid, glacial acetic acid as the solvent in step (b) and maintaining a temperature of about 20 to 50° C. during this treatment.

(c) Mixing the aforesaid compound of Formula III in a solvent inert to halogenation, with a halogenating agent, which is preferably elementary bromine or chlorine, at about 0° to 200° C., thereby halogenating the compound of Formula III to a compound of the formula

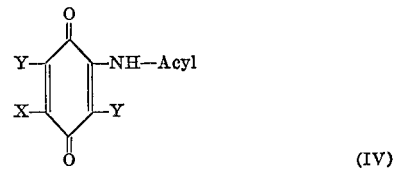

(IV)

wherein acyl and X have the aforesaid meanings and Y represents chlorine or bromine, and, preferably, separating the latter compound from the reaction mixture.

Preferably, this step (c) is carried out with bromine as halogenating agent in an inert solvent such as chloroform, dichlorobenzene or glacial acetic acid.

Where the compound of Formula IV is to be used as an intermediate for the preparation of dioxazines, the conversion to the later is carried out by the following step:

(d) Mixing the aforesaid compound of Formula IV in an inert organic solvent having a boiling point of at least 70° C., and preferably above 140° C., such as a tri-lower alkyl amine—and preferably in tri-isopropyl amine to obtain optimal results—with at least two moles of an aromatic amine, at least part of the aromatic nucleus of which consists of a benzene ring substituted (1) with one —NH₂ group and (2) in one ortho-position thereto with a substituent which is either lower alkoxy, cycloalkoxy, mononuclear carbocyclic aralkoxy, carbocyclic aryloxy or carbocyclic arylthio;

And an acid binding agent, such as an alkali metal acetate or magnesium oxide or hydroxide, and heating at least during the final phase of the ensuing reaction at a temperature of about 140° to 300° C., and maintaining, at least throughout said final phase of said ensuing reaction, a weakly acid medium, thereby obtaining a dioxazine of the formula

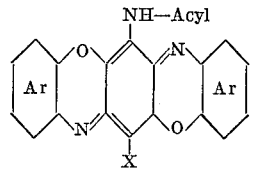

(V)

wherein acyl and X have the aforesaid meanings, and

Ar represents the radical of said aromatic amine the benzene ring of which is condensed with the quinone ring of said compound of Formula IV under removal of the aforesaid substituent Z;

and recovering the dioxazine of Formula V from the reaction mixture.

Known acylamino-1,4-benzoquinones which have been used as intermediates in the production of dioxazine dyestuffs, are 2,5-diacetylamino- and 2,5-dibenzoylamino-1,4-benzoquinone and also 2,5-diacetylamino- or 2,5-dipropionyl-amino-3,6-dichloro-1,4-benzoquinone. The first quinone mentioned is obtained by oxidizing 2,5-diacetylaminophenol with sodium bichromate, and 2,5-dibenzoylaminobenzoquinone, 2,5-diacetylamino- or 2,5-dipropionyl-amino-3,6-dichloro-1,4-benzoquinone are obtained by reacting 2,5-diamino-1,4-benzoquinone or 2,5-diamino-3,6-dichloro-1,4-benzoquinone with benzoyl chloride or acetic acid anhydrides or propionic acid anhydride respectively. Thus, they have been produced from starting materials which in themselves are not easily accessible, and with only moderate yields of acylamino compounds.

The novel acylamino-1,4-benzoquinones are distinguished from the last-described known compounds by their structure which is comprised by Formula III or Formula IV. Of particular interest as important intermediates are the compounds of the formula

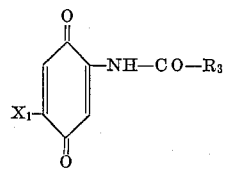

(VI)

wherein $X_1$ is a member selected from the group consisting of chlorine, bromine and fluorine, and $R_3$ is a member selected from the group consisting of a chloro-substituted and a bromo-substituted alkanoic acyl radical each with maximally 4 carbon atoms, an alkoxy-substituted alkanoic acyl radical with a total of maximally 10 carbon atoms, and wherein alkoxy has maximally 4 carbon atoms; an N-unsubstituted, an N-lower alkyl-substituted and an N-phenyl-substituted amino alkanoic acyl radical, each of which has a total of maximally 10 carbon atoms, an alkenoic acyl radical with maximally 5 carbon atoms, a cyclohexane carboxylic acyl radical, an aralkanoic radical with maximally 10 carbon atoms, an aromatic carbocyclic hydrocarbon carboxylic acyl radical with maximally 12 carbon atoms, which compounds are obtained by step (b) from the corresponding starting material of Formula Ib.

Oxidation and halogenation of compounds of Formula Ib according to steps (b) and (c) of the above-described process produces, among others, compounds of formula

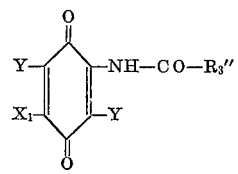

(VII)

wherein $X_1$ is a member selected from the group consisting of chlorine, bromine and fluorine, Y is a member selected from the group consisting of chlorine, and bromine, and $R_3''$ is a member selected from the group consisting of a chloro-substituted and a bromo-substituted alkanoic acyl radical each with maximally 4 carbon atoms, an alkoxy-substituted alkanoic acyl radical with a total of maximally 10 carbon atoms, and wherein alkoxy has maximally 4 carbon atoms; an N-unsubstituted, an N-lower alkyl-substituted and an N-phenyl-substituted amino alkanoic acyl radical, each of which has a total of maximally 10 carbon atoms.

From among the compounds falling under Formulas VI and VII and structurally closely related compounds obtainable in the same manner, the production of which conforms to the methods by which the compounds of the last-mentioned formulas are produced, those of the formulas

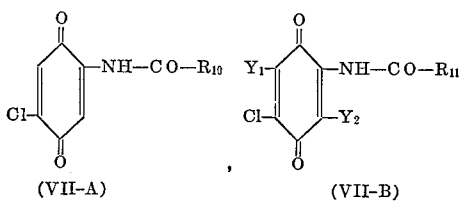

(VII-A)     (VII-B)

and

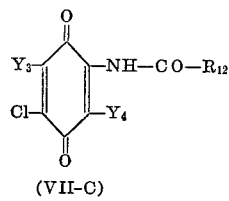

(VII-C)

wherein each of $Y_1$ and $Y_2$ represents a member selected from the group consisting of bromine and chlorine each of $Y_3$ and $Y_4$ represents a member selected from the group consisting of:

hydrogen, chlorine and bromine, and $R_{10}CO$—, in Formula VII-A, represents a member selected from the group consisting of unsubstituted alkanoic acyl of from 3 to 10 carbon atoms, mono to tri-chloro-, mono- to tri-bromo- and mono- to tri-fluorosubstituted alkanoic acyl of from 2 to 19 carbon atoms, phenyl-carbonyl, chloro-phenyl carbonyl, cinnamylcarbonyl, cinamoyl, bromo-phenyl carbonyl, trifluoromethyl phenyl, carbonyl, lower alkyl-phenyl carbonyl, lower alkoxy-phenyl carbonyl, nitro-phenyl carbonyl;

$R_{11}$—CO— is a member selected from the group consisting of unsubstituted alkanoic acyl of from 2 to 19 carbon atoms, mono to tri-chloro-, mono- to tri-bromo- and mono- to tri-fluorosubstituted alkanoic acyl, of from 2 to 19 carbon atoms, phenyl carbonyl, chloro-phenyl carbonyl, bromo-phenyl carbonyl, trifluoromethyl-phenyl carbonyl, lower alkyl-phenyl carbonyl, lower alkoxy-phenyl carbonyl, nitrophenyl carbonyl, cinnamoyl and cinnamylcarbonyl;

$R_{12}$—CO— is a member selected from the group consisting of:

alkoxycarbonyl of from 2 to 13 carbon atoms, chloro-, bromo- and fluoro-substituted alkoxy-carbonyl, of from 3 to 13 carbon atoms, at least two carbon atoms being present intermediate the aforesaid halogen substituent and the —CO— moiety of the $R_{12}$—CO— group;

alkoxy-substituted alkylcarbonyl, having a total of from 3 to 19 carbon atoms, alkoxy-substituted alkoxy-carbonyl having a total of from 3 to 19 carbon atoms, at least two carbon atoms being present in the alkoxy bridge intermediate the terminal alkoxy-substituent and the —CO— moiety of the $R_{12}$—CO— group, phenoxy-carbonyl, chloro-phenoxy-carbonyl, bromo-phenoxy-carbonyl, nitro-phenoxy-carbonyl, trifluoromethyl-phenoxy-carbonyl, lower alkyl-phenoxy-carbonyl and lower alkoxy-phenoxy-carbonyl, and cinnamyloxy-carbonyl;

are distinguished by fungicidal activity.

It is particularly surprising that the compounds of Formulas VII–A/C which are characterized by a chlorine atom in 2-position at the benzo-quinone nucleus are distinguished from the corresponding similarly substituted 2-bromo-benzoquinones by much stronger fungicidal activity against a much greater number of the aforesaid species. Thus, the known 2,3,6-tri-bromo-5-acetylamino-1,4-benzoquinone shows only significant activity against two of the above-enumerated strains, namely against *Botrytis cinera* and against *Clasterosporium c.*, while 2-chloro-3,6-dibromo-5-acetylamino-1,4-benzoquinone is ten times more active against these two fungi and is moreover also very active against the six remaining species against which the aforesaid known compound fails to show fungicidal activity of practical significance.

Other 2-bromo derivatives such as 5-chloroacetylamino-2 - bromo- and 5-chloroacetylamino-2,3,6-tribromo-1,4-benzoquinone show no practically significant activity against any of the aforesaid eight species, while the corresponding 2-chloro analogs show good to very good activity against 5 to 8 of these species.

The present invention therefore concerns, in another aspect, fungicidal 2-chlorinated 5-acylamino-1,4-benzoquinones as well as compositions containing the same as active ingredients, and also the use of halogenated acyl-amino-1,4-benzoquinones and of compositions containing the same in a method for controlling phytopathogenic fungi.

In a further aspect the present invention concerns new fungicidal agents which contain 2-halogenated 5-acyl-amino-1,4-benzoquinones falling under Formulas VI and VII as active ingredients, processes for the production of these agents as well as the method of combating phytopathogenic fungi of the Botrytis and Clasterosporium type using such active ingredients or agents which contain these active ingredients.

Details concerning these aspects of the invention are given further below.

Oxidation in accordance with step (b) of the process according to the invention produces, among others, particularly interesting compounds of the formula

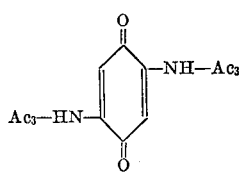

(VIII)

wherein each of $Ac_2$ and $Ac_3$ is, independently, a member selected from the group consisting of a chloro-alkanoic acyl radical with maximally 4 carbon atoms, a bromo-alkanoic acyl radical with maximally 4 carbon atoms, an alkoxy-alkanoic acyl radical with maximally 10 carbon atoms, a cycloalkanoic acyl radical with 6–7 carbon atoms, an aralkanoic acyl radical with maximally 10 carbon atoms, a naphthoic acyl radical with maximally 12 carbon atoms, a pyridinocarboxylic acyl, and a lower alkoxy carbonyl radical, preferably from the corresponding starting compounds of Formula Ia, when $Ac_2$ and $Ac_3$ in Formula VIII are to represent different radicals, and from starting compounds of Formula Ic when compounds of Formula VIII are desired in which $Ac_2$ and $Ac_3$ are identical.

Halogenation of the intermediates of Formula VIII in accordance with step (c) of the above-described process leads to the formation of halogenated products, of which those of the formula

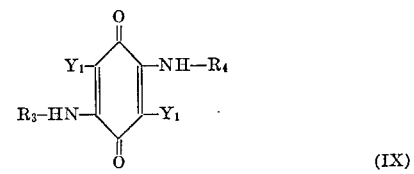

(IX)

wherein $Y_1$ is a member selected from the group consisting of chlorine and bromine, and each of $R_3$ and $R_4$ is, independently, a member selected from the group consisting of a mononuclear carbocylic aralkanoic acyl radical of maximally 10 carbon atoms and an aromatic carbocyclic hydrocarbon carboxylic acyl radical with maximally 12 carbon atoms, are of special interest as intermediates for dioxazines which are excellent pigments.

Particularly interesting as intermediates are those of the above Formula IX in which $Y_1$ is bromine.

Further details concerning the above aspect of the invention can be seen from the following non-limitative examples. Where not otherwise stated, parts are given as parts by weight. The temperatures are in degrees Centigrade. The relationship of parts by weight to parts by volume is as that of grams to cubic centimeters. The melting points were determined in a metal block and are not corrected.

Example 1.—2,5-di-(4'-chlorobenzoylamino)-1,4-benzoquinone 47.33 parts of 2,5-di-(4'-chlorobenzoylamino)-1,4-diethoxybenzene are suspended in 300 parts of glacial acetic acid. A mixture of 40 parts of 63% nitric acid and 40 parts of glacial acetic acid is poured into this suspension while stirring well. The mixture is stirred for 15 minutes at 40–50° and then cooled to 10°. The yellow 2,5-di-(4'-chlorobenzoylamino)-1,4-benzoquinone which precipitates in a very pure form is filtered off. To further purify, it is recrystallised from 1,2-dichlorobenzene or from glacial acetic acid. M.P.:>320° (under decomposition); the yield is 96% of the theoretical.

The 2,5 - di-(4'-chlorobenzoylamino)-1,4-diethoxybenzene used as starting material is produced by reaction of 1 mol of 2,5-diamino-1,4-diethoxybenzene with 2 mols of 4-chlorobenzoyl chloride.

Other 2,5-diacylamino-1,4-benzoquinones characterised by their melting points are produced in the yields given if, instead of 2,5-di-(4'-chlorobenzoylamino)-1,4-diethoxy-benzene, compounds of the formula

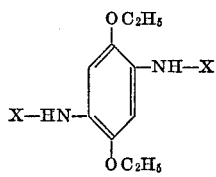

are used wherein X has the meaning given in Column II of Table I, and otherwise the procedure described in the example is followed.

stirring to this suspension at 40°. After stirring for 20 minutes and cooling to 10°, the yellow 2-(2',4'-dichlorobenzoylamino)-5-benzoylamino-1,4-benzoquinone formed is filtered off and washed, first with water and then with ethanol. Crystallised from glacial acetic acid, it forms long golden yellow needles. M.P. 205–207°. Yield: 87%.

The 2 - (2',4'-dichlorobenzoylamino)-5-benzoylamino-1,4-diethoxybenzene used as starting material is obtained by condensation of 1 mol of 2-amino-5-benzoylamino-1,4-diethoxybenzene with 1 mol of 2,4-dichlorobenzoyl chloride.

If, instead of 2-(2',4'-dichlorobenzoylamino)-5-ben-

TABLE I

| Example No. | X | M.P. of corresponding quinone (D means under decomposition) | Yield in percent of theoretical |
|---|---|---|---|
| 2 | —COCH₃ | 300 D | 84 |
| 3 | —COC₅H₁₁ | 240° | 87 |
| 4 | —COOCH₃ | 250–260 D | 94 |
| 5 | —COOC₂H₅ | 210–211 | 94 |
| 6 | —COOCH₂CH₂—OCH₃ | 142–143 | 98 |
| 7 | —CO—C₆H₅ | 258–260 | 90 |
| 8 | —CO—C₆H₄—CH₃ | >320 D | 85 |
| 9 | —CO—C₆H₄—OCH₃ | 305–307 D | 88 |
| 10 | —CO—C₆H₄—Cl | 237–238 | 93 |
| 11 | —CO—C₆H₃Cl₂ | 273–275 | 85 |
| 12 | —CO—CH₂—C₆H₅ | 233–224 | 87 |
| 13 | —COCH=CH—C₆H₅ | >330 D | 84 |
| 14 | —CO—(pyridyl) (Quinones isolated as HNO₃ salt) | >320 D | 84 |
| 15 | —SO₂—C₆H₅ | >260 D | 88 |
| 16 | —SO₂—C₆H₄—NO₂ | 272–273 D | 92 |
| 17 | —SO₂—CH₃ | >320 D | 87 |
| 18 | —CO—CH₂—CH₂—Cl | | |
| 19 | —COO—CH₂—CH₂—Cl | | |

Example 20.—2-(2',4'-dichlorobenzoylamino)-5-benzoylamino-1,4-benzoquinone 14.2 parts of 2-(2',4'-dichlorobenzoylamino)-5-benzoylamino - 1,4-diethoxybenzene are suspended in 250 parts of glacial acetic acid. A mixture of 15 parts by volume of fuming nitric acid (density=1.52) and 15 parts by volume of glacial acetic acid is added while zoylamino-1,4-diethoxybenzene, compounds of the formula

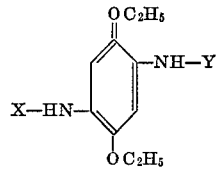

are used in which X and Y have the meanings given in columns II and III of Table II and otherwise the procedure described in the example is followed, then other 2,5-diacylamino-1,4-benzoquinones unsymmetrically substituted at the acyl groups are obtained in the yields given. The melting points are given in column IV of the table:

TABLE II

| Example No. | X | Y | M.P. of the corresponding quinones (D means under decomposition) | Yield in percent of theoretical |
|---|---|---|---|---|
| 21 | —COCH₃ | —CO—⌬ | 236–237 D | 83 |
| 22 | —COCH₃ | —CO—NHC₂H₅ | 244–245 D | 88 |
| 23 | —COCH₃ | —SO₂CH₃ | 246–247 D | 89 |
| 24 | —COCH₃ | —COOC₂H₅ | 254–255 D | 86 |
| 25 | —COOCH₃ | —CO—⌬ | 185–186 | 87 |

Example 26.—2-chloro-5-(4'-chlorobenzoylamino)-1,4-benzoquinone 16.8 parts of 2-chloro-5-(4'-chlorobenzoylamino)-1,4-dimethoxybenzene are finely pulverised and suspended in 100 parts by volume of glacial acetic acid. At 25°, a mixture of 20 parts of 63% nitric acid and 20 parts by volume of glacial acetic acid is poured in. The temperature rises about 10°. For a short time a strongly yellow coloured solution is formed from which the yellow quinone precipitates. The reaction mixture is stirred for another 10 minutes, then cooled to 10° and the precipitate is filtered off under suction. Still further quinone is obtained by precipitation from the filtrate with water. The quinone is first washed with water and then it is washed with a little ethanol. It is further purified by recrystallisation from glacial acetic acid and it then melts at 168°; the yield is quantitative.

Other 2-chloro-5-acylamino-1,4-benzoquinones characterised by their melting points are given in the following table. They are obtained in the yields given if, instead of 2-chloro-5-(4'-chlorobenzoylamino)-1,4-dimethoxybenzene, compounds of the formula

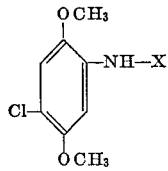

are used wherein X has the meaning given in column II of Table III and otherwise the procedure described in the example is followed.

Those of these compounds of Table III as well as those of the compounds described in the following Examples 55 to 77k (Table IV below) which fall under Formulas VII–AC are distinguished by good to very good fungicidal activity as outlined hereinbefore, accompanied by generally extraordinarily slight phytotoxicity.

TABLE III

| Expl. No. | X | M.P. of the corresponding quinones (D means under decomposition) | Yield in percent of theoretical |
|---|---|---|---|
| 27 | —COCH₃ | 174–175 | 93 |
| 28 | —COOCH₃ | 172 | 88 |
| 29 | —COOC₂H₅ | 98 | 86 |
| 30 | —SO₂CH₃ | 197–198D | 94 |
| 31 | —SO₂—⌬ | 181–182 | 97 |
| 32 | —CO—⌬ | 152–154 | 92 |
| 33 | —CO—⌬—OCH₃ | 187–188 | (¹) |
| 34 | —CO—⌬—CH₃ | 165–166 | (¹) |
| 35 | —CO—⌬—NO₂ | 192–193 | 96 |
| 36 | —CO·CH₂—⌬ | 194–195D | 97 |
| 37 | —CO—CH=CH—⌬ | 240–241D | 90 |
| 38 | —CONH—⌬ | 224D | 97 |
| 39 | —CO(CH₂)₆—CH₃ | 118–120 | 95 |
| 40 | —CO(CH₂)₇—CH₃ | 114–115 | 89 |
| 41 | —CO(CH₂)₈—CH₃ | 115–116 | 78 |
| 42 | —CO(CH₂)₁₀—CH₃ | 115–117 | 85 |
| 43 | —CO(CH₂)₁₄—CH₃ | 117–119 | 87 |
| 44 | —CO(CH₂)₁₆—CH₃ | 111–113 | 83 |
| 45 | —COOCH₂CH₂Cl | 174–175 | 92 |
| 46 | —COOC₅H₁₁ | 137–138 | 92 |
| 47 | —COOCH₂CH₂OCH₃ | 117 | 89 |
| 48 | COO—⌬ | 157 | 95 |
| 49 | —CO—CH₂Cl | 157–158 | 92 |
| 50 | COOC₃H₇ | | |
| 51 | COOC₄H₉ | | |
| 52 | COCHCl₂ | 157 | 87 |
| 53 | COCCl₃ | 197–198 | 89 |
| 54 | CO—⌬(H) | 166–167 | 96.5 |
| 54a | CO—OCH₂CH₂CH₂Cl | 134 | |
| 54b | CO—OCH(CH₂Br)₂ | 122 | |
| 54c | CO—OC₁₀H₂₁ | 71 | |
| 54d | CO—OC₁₂H₂₅ | 75 | |
| 54e | CO—CH₂O(CH₂)₅CH₃ | 66 | |
| 54f | CO—CH₂CH₂Cl | 178–179 | |
| 54g | CO—CH=CHCH₃ | 155 | |
| 54h | CO—CHBrCHBrCH₃ | 124–126 | |
| 54i | CO—(CH₂)₄CH₃ | 158–159 | |
| 54j | CO—⌬—Cl | 168 | |
| 54k | CO—⌬—CF₃ | | |
| 54l | 2-fluoro-5-(β-chloropropionyl)-amino 1,4-benzoquinone | | |

¹ Quantitative.

The starting material for the latter compound, 2,5-dimethoxy - 4-β-chloro-propionylamino-1-fluorobenzene, is produced from 2,5-dimethoxy-4-nitraniline by diazotization with addition of borofluoric acid or sodium borofluoride and thermic decomposition of the resulting 2,5-dimethoxy-4-nitro-1-diazoniumbenzene tetrafluoroborate, in accordance with the method described by Schiemann in J. für prakt. Chemie 140, p. 7 et seq. (1934), conversion of the resulting 2,5-dimethoxy-4-nitro-1-fluorobenzene by catalytic hydrogenation to 2,5-dimethoxy-4-amino-2-fluorobenzene and acylation of the latter in a known manner to the aforesaid starting material.

Example 55

59.22 parts of the 2-chloro-5-(4'-chlorobenzoylamino) 1,4-benzoquinone obtained in Example 26 are suspended in 300 parts by volume of chloroform. At 20–30°, a mixture of 24.8 parts by volume of bromine and 50 parts by volume of chloroform is added to this suspension within 30 minutes. The reaction mixture is then stirred for 15 hours at room temperature, 300 parts by volume of ethanol are added, whereupon the temperature rises by 10 degrees, and then the whole is stirred for another hour. The reaction mixture is then cooled to 0 to 5° and the precipitated quinone is filtered off. It is washed first with water and then with ethanol and dried.

The 2 - chloro - 5 - (4' - chlorobenzoylamino) - 3,6-dibromo-1,4-benzoquinone crystallizes from ethanol in yellow crystals M.P. 211°; yield 92% of the theoretical.

Example 56

37.2 parts of 2-chloro-5-[3'-diethylamino-5'-chloro-triazinylamino-(1')]-1,4-dimethoxybenzene (M.P. 161–162°), produced by condensation of cyanuric chloride with one mol of 2,5-dimethoxy-4-chloroaniline and one mol of diethylamine, are suspended in 200 parts of glacial acetic acid. A mixture of nitric acid and glacial acetic acid is then poured in at room temperature analogously to Example 26. For a moment a solution is formed from which the quinone precipitates in crystalline form. The suspenson is stirred for 10 minutes at 20–25°, then cooled to 10° and filtered. The resulting 2-chloro-5-[3'-diethylamino - 5' - chloro - triazinylamino - (1')] - 1,4 - benzoquinone is washed first with water and then with cold alcohol and dried. Yield: 97.4% of the theoretical.

Example 57

When, instead of 37.2 parts of 2-chloro-5-[3'-diethylamino - 5' - chloro - triazinylamino - (1)] - 1,4 - dimethoxybenzene, 40.6 parts of the condensation product from one mol 2,4,5,6-tetrachloro-pyrimidine and one mol of 2,5-dimethoxy-4-chloro-aniline and one mol of diethylamine is used and otherwise the procedure described in Example 55 is followed, then the corresponding quinone product which is a mixture of a major portion of the compound of the formula

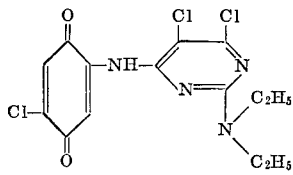

and a minor portion of the compound of the formula

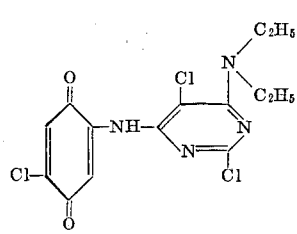

is obtained in similarly good yields.

Example 58

39.7 parts of the condensation product of 1 mol of 2,6-dichloro-pyrimidine-4-carboxylic acid chloride and 1 mol of 1-amino-4-chloro-2,5-dimethoxybenzene in 250 parts of glacial acetic acid are treated at 20 to 30° with 30 parts of 10 N nitric acid. A yellow quinone of the formula.

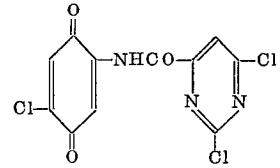

precipitates and it is isolated in the usual way.

Example 59

A yellow quinone of the formula

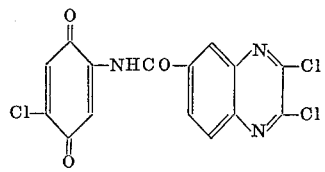

is obtained when instead of the condensation product of 2,6-dichloropyrimidine-4-carboxylic acid chloride and 1-amino-4-chloro-2,5-dimethoxybenzene, 40.25 parts of the condensation product of 1 mol of 2,3-dichloro-quinoxaline - 6 - carboxylic acid chloride and 1 mol of 1-amino-4-chloro-2,5-dimethoxybenzene are used and the procedure given in Example 58 is followed.

When, instead of 2-chloro-5-(4'-chlorobenzoylamino) 1,4-benzoquinone used in Example 55, compounds are used of the formula

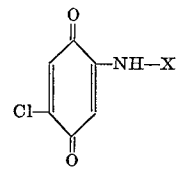

wherein X has the meaning given in column II of the following table and otherwise the procedure described in Example 55 is employed, then further 2-chloro-5-acyl-amino-3,6-dibromo-1,4-benzoquinones are obtained the melting points of which can be seen from column III of Table IV:

TABLE IV

| Expl. No. | X | M.P. (° C.) |
|---|---|---|
| 60 | CO(CH$_2$)$_6$CH$_3$ | 138–140 |
| 61 | CO(CH$_2$)$_7$CH$_3$ | 136–137 |
| 62 | CO(CH$_2$)$_8$CH$_3$ | 134–136 |
| 63 | CO(CH$_2$)$_{10}$CH$_3$ | 131–132 |
| 64 | CO(CH$_2$)$_{14}$CH$_3$ | 131–133 |
| 65 | CO(CH$_2$)$_{16}$CH$_3$ | 134–137 |
| 66 | COCH$_2$Cl | 192–193 |
| 67 | COCH$_2$CH$_2$Cl | 178–179 |
| 68 | COOCH$_2$CH$_2$Cl | 155–156 |
| 69 | —COCH$_2$—C$_6$H$_5$ | 186 Z |
| 69a | —CO—O—CH$_2$—CH=CH—C$_6$H$_5$ | |
| 70 | —COOCH$_2$CH$_2$OCH$_3$ | 126 |
| 71 | COC$_5$H$_{11}$ | 158–159 |
| 72 | COO—C$_6$H$_5$ | 176–177 |
| 73 | COCH$_3$ | 182 |
| 74 | COCHCl$_2$ | 208–209 |
| 75 | CO—C$_6$H$_5$ | 175–176 |
| 76 | COCCL$_3$ | 204–205 |
| 77 | SO$_2$CH$_3$ | 201 |
| 77a | CO—OCH$_3$ | 169 |
| 77b | CO—OC$_2$H$_5$ | 115–116 |
| 77c | CO—O—n—C$_3$H$_7$ | 122 |
| 77d | CO—OC$_3$H$_6$Cl | 143 |
| 77e | CO—OC$_{10}$H$_{21}$ | 66 |

TABLE IV—Continued

| Expl. No. | X | M.P. (° C.) |
|---|---|---|
| 77f | CO—OC$_{12}$H$_{25}$ | 69 |
| 77g | CO—OCH(CH$_2$Br)$_2$ | |
| 77h | CO—CH$_2$O(CH$_2$)$_5$CH$_3$ | 77 |
| 77i | CO—CHBrCHBrCH$_3$ | 183 |
| 77j | 2-fluoro-3,6-dibromo-5-β-chloropropionyl-amino-1,4-benzoquinone (from the compound of Example 54 1.) | |

Example 77k

Example 55 is repeated, but instead of 24.8 parts by volume of bromine, gaseous chlorine is introduced into the solution in sufficient amount and for a sufficient length of time, so that at least 2 moles of chlorine are retained in the reaction mixture for every mole of the starting benzoquinone, all other conditions remaining equal.

The resulting 2,3,6 - trichloro - 5 - (4' - chloro - benzoylamino)-1,4-benzoquinone crystallizes from ethanol in yellow crystals; yield about 80% of the theoretical value.

In a similar manner, but using an equimolar amount of 2 - chloro - 5 - chloroacetylamino - 1,4 - benzoquinone as starting material and introducing chlorine only in sufficient amount to retain one mole thereof per mole of said starting material, and operating in aqueous 50%-acetic acid suspension instead of in chloroform, there is obtained 2,6 - dichloro - 5 - chloroacetylamino - 1,4 - benzoquinone.

Example 78.—2,5-diacetylamino-1,4-benzoquinone 5.6 parts of 2,5-diacetylamino-1,4-diethoxybenzene are dissolved in 50 parts by volume of concentrated sulfuric acid and 4.74 parts of potassium permanganate are added in small portions while cooling with ice. The solution is then stirred for 30 minutes and poured onto ice. The 2,5-diacetylamino-1,4-benzo-quinone which precipitates is filtered off and washed with water. The yield is 70% of the theoretical.

Example 79.—2,5-diacetylamino-1,4-benzoquinone 14 parts of 2,5-diacetylamino-1,4-diethoxybenzene are heated with 400 parts by volunme of glacial acetic acid to 90°. At this temperature, 48 parts of 18.9% lead dioxide are added within 40 minutes, whereupon the mixture is boiled for a short time and then cooled. The precipitated 2,5-diacetylamino-1,4-benzoquinone is filtered off at 20° and washed with water. The yield is 26% of the theoretical.

Example 80.—2,5-dibenzoylamino-1,4-benzoquinone 17.1 parts of 1,4-diethoxy-2,5-dibenzoylaminobenzene are heated to 100° in 250 parts by volume of glacial acetic acid. At this temperature, 30 parts of dry sodium bichromate are added within 15 minutes. The reaction mixture is then cooled to 10° and the precipitated 2,5-dibenzoylamino-1,4-benzoquinone is filtered off. The yield is 40% of the theoretical.

Example 81.—2,5-diacetylamino-3,6-dichloro-1,4-benzoquinone 14 parts of finely pulverized 2,5-diacetylamino-1,4-diethoxybenzene are suspended in 250 parts of glacial acetic acid and 20 parts by volume of concentrated hydrochloric acid are added at 40°. 20 parts by volume of hydrogen peroxide are poured into the mixture whereupon the temperature rises. When it has attained 60°, the orange red solution is cooled to room temperature and poured into 1000 parts by volume of water. The 2,5-diacetylamino-3,6-dichloro-1,4-benzoquinone which precipitates after a short time is filtered off and washed with water. It melts at 246°; yield 71% of the theoretical.

Example 82.—2,5-diacetylamino-3,6-dichloro-1,4-benzoquinone 14 parts of 2,5-diacetylamino-1,4-diethoxybenzene are suspended in 200 parts by volume of glacial acetic acid and 20 parts by volume of concentrated hydrochloric acid are added. The reaction mixture is heated to 40° and anhydrous chlorine gas is introduced for 10 minutes, during which the temperature should not rise over 60°. The solution is cooled to 10° and the quinone is filtered off. The yield of 2,5-diacetylamino-3,6-dichloro-1,4-benzoquinone is 21% of the theoretical.

Example 83.—2,5-diacetylamino-3,6-dichloro-1,4-benzoquinone 14 parts of 2,5-diacetylamino-1,4-diethoxybenzene are suspended in 200 parts by volume of glacial acetic acid and 20 parts by volume of concentrated hydrochloric acid and 8.61 parts of potassium chlorate are added at 50–60° within 10 minutes. This mixture is stirred for 15 minutes at this temperature and then the quinone is filtered off at 10°. The yield of 2,5-diacetylamino-3,6-dichloro-1,4-benzoquinone is 35% of the theoretical.

According to yet another aspect of the invention, dioxazines which are particularly satisfactory as pigments are obtained when, in accordance with step (d) supra, a 3,6-bis-(aroylamido)-1,4-benzoquinone compound of the formula

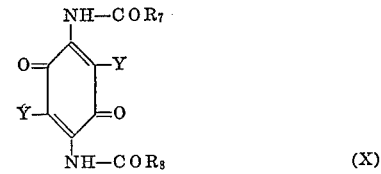

(X)

wherein Y has the aforesaid means, and R$_7$ and R$_8$ each represent phenyl or a naphthyl radical, is condensed simultaneously or in stages with twice the equimolar quantity of a primary aryl amine or of two different aryl amines are defined above, the aryl radicals of which contain hydrogen or a replaceable substituent in an ortho-position in relation to the NH$_2$ group and may contain other substituents, which are usual in dyestuffs and pigments, and/or may contain condensed heterocyclic rings in the remaining positions, if desired in the presence of inert organic diluents and/or condensation agents to form a dianil of the general formula

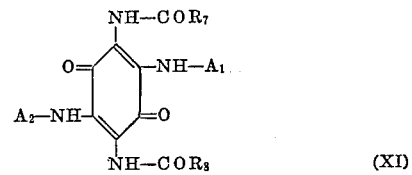

(XI)

wherein R$_7$ and R$_8$ have the above meanings, and A$_1$ and A$_2$ represent, independently of each other, aryl radicals of primary aryl amines as defined above, and the dianl of Formula XI is ring-closed by means of moderate heating in dilluents and, in some cases, where the primary amine contains no ether group in ortho-position to the NH$_2$-group at the above-mentioned benzene nucleus, in the presence of condensation and/or oxidizing agents, to form a compound of the formula

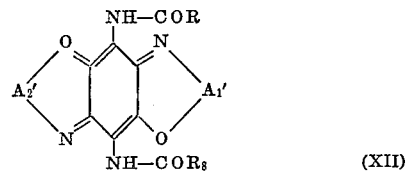

(XII)

wherein R$_7$ and R$_8$ have the above meanings, and A$_1$' and A$_2$' represent ortho-arylene radicals corresponding to the above-defined aryl radicals A$_1$ and A$_2$.

The dianils of Formula XI, used in accordance with the invention, are novel. They are obtained in accordance with step (d) of the above-described process by reacting a 2,5-di-halogen-3,6-bis-[aroylamido]-1,4-benzoquinone with primary aryl amines, which contain hydrogen or a mobile substituent in the o-position in relation to the NH₂ group, for example in ethylene glycol monoethyl ether or in an aromatic hydrocarbon such as benzene, chlorobenzene or dichlorobenzene, if required in the presence of an acid-neutralizing medium, such as alkali hydroxide, for example sodium hydroxide or alkaline earth oxide or -hydroxide, for example magnesium oxide, alkali carbonate, for example in the presence of an alkali salt of a low fatty acid, for example sodium acetate or of tertiary bases, such as for example, tri-isopropanol amine, methyldicyclohexyl amine or tri-isobutyl amine.

The dianils of Formula XI, produced in this manner, may be isolated before their conversion to the dioxazine compounds of Formula XII. However, it is frequently advantageous to convert the substances, which are used for their production, directly into the dioxazine pigments of Formula XII without isolating these dianils.

The condensation of the compounds of Formula XI to the dioxazine pigments of Formula XII is preferably carried out, in conformity with step (d) of the above-described process, under moderate heat in inert organic solvents, in some cases in the presence of acids, acid-yielding or acid-forming compounds, if necessary in the presence of oxidizing agents. The thermal ring-closure in high boiling solvents is preferred, and, when required, oxidizing agents are used but no acid condensation agents, since the use of the latter, in contrast to the known condensations produced with chloranil, generally lead to poorer yields. In the thermal ring-closure, starting materials containing phenoxy groups as replaceable substituents are preferred, since the latter can be generally more easily split-off than alkoxy groups.

Suitable inert organic solvents are, in particular, aromatic hydrocarbons of the benzene or naphthalene series, which may be halogenated, namely: the xylenes, nitrobenzene, di- and trichlorobenzenes, naphthalene and α-chloronaphthalene, liquid alcohols with up to 12 carbon atoms and the esters thereof, such as, ethanol, propanol, benzyl alcohol, ethylene glycol, the ethylene glycol-methyl, -ethyl and -phenyl ethers, and the acetates, benzoates and phthalates thereof.

Concentrated inorganic oxygen-containing acids, such as sulfuric acid or polyphosphoric acids, and strong organic acids, such as di- or trihaloacetic acids, are suitable as acids.

Examples of acid-yielding or acid-forming compounds are in particular the acid halides of carboxylic or sulfonic acids, such as benzoyl chloride or 4-methylbenzenesulfonic acid chloride, furthermore also thionylchloride, phosphorus pentachloride or metal chlorides, such as aluminum chloride.

Atmospheric oxygen and aromatic nitro compounds, namely nitrobenzene or nitrobenzene sulfonic acids may be mentioned as suitable oxidizing agents. The choice of condensation agents and conditions is based on the starting compounds used in each particular instance.

Dianils of Formula XI, wherein A₁ and A₂ each contain an ether group in the o-position in relation to the NH-group as replaceable substituents, are heated to 100–300° C., preferably to 150–260° C., in a mixture consisting of an inert organic solvent and an acid-binding agent.

Dianils of Formula XI wherein A₁ and A₂ each contain an ether group, preferably a phenoxy group which may be substituted, in the 2- and 4-position in relation to the NH group, may be converted to the dioxazine compounds of Formula XII at relatively low temperatures and without further additives by being heated in inert organic solvents.

The dianils of Formula XI wherein A₁ and A₂ each represent an aromatic radical containing a hydrogen atom in the o-position in relation to the NH group, are preferably condensed in an organic solvent in the presence of an oxidizing agent and in some cases in the presence of an acid-yielding agent.

Example 84.—2,5-dibromo-3,6-bis-benzoylamino-1,4-benzoquinone 138.6 parts of 3,6-bis-benzoylamino-1,4-benzoquinone (Example 7, supra) are suspended in 1050 parts by volume of chloroform. 166.2 parts of bromine in 100 parts by volume of chloroform are poured into this suspension within 15 minutes, whereupon the whole is boiled for 12 hours. After the addition of another 15.5 parts of bromine, the whole is boiled for a further 10 hours, then cooled to 20–25° and 200 parts by volume of ethanol are added to the suspension. It is then stirred for 10 minutes at this temperature, cooled to 0 to 5° and the mixture consisting of 2,5-bis-benzoylamino-3,6-dibromo-hydroquinone and 2,5-bis-benzoylamino-3,6-dibromo-1,4-benzo-quinone is filtered off. It is washed with ethanol and dried. The dried mixture is then suspended in 700 parts by volume of glacial acetic acid, heated to 45° and 60 parts of 63% nitric acid dissolved in 100 parts by volume of glacial acetic acid are added. The suspension which slowly turns yellow is stirred for 45 minutes at 40–45°, then cooled to 10° and filtered. The 2,5-dibromo-3,6-bis-benzoylamino-1,4-benzoquinone formed is washed with water and then with ethanol and dried. Yield: 183.3 parts=91.2% of the theoretical. M.P. 248° (under decomposition).

Example 85

When, in the preceding Example 84, 157 parts of 2,5-di-(2'-chlorobenzoylamino)-1,4-benzoquinone (Example 1) are used instead of 138.6 parts of 2,5-di-benzoylamino-1,4-benzoquinone, then 2,5-di-(2'-chlorobenzoylamino)-3,6-dibromo-1,4-benzoquinone is obtained with a yield of 94%.

Example 86

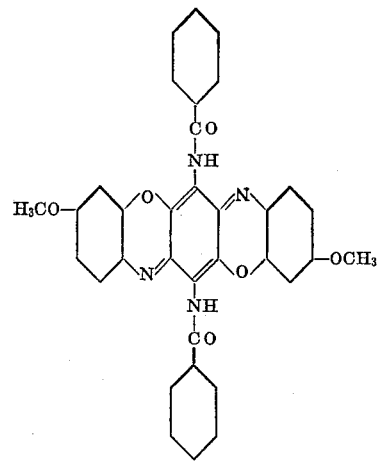

20.16 parts of 2,5-dibromo-3,6-bis-(benzoylamino)-1,4-benzoquinone obtained as described in Example 84, 12.3 parts of 1-amino-2,4-dimethoxybenzene and 13.1 parts of anhydrous sodium acetate are heated for 30 minutes at 200–210° in 250 parts by volume of 1-chloronaphthalene with stirring. The dark red suspension, which is formed, is filtered off at 140°, the residue is washed with ethanol, water, a mixture of ethyleneglycol monoethylether and diluted caustic soda, water and finally with acetone and then dried. 13.7 parts of a red-brown crystalline product of the above indicated formula are obtained. To obtain a fine dispersion it is ground with sodium chloride, sodium sulfate or anhydrous calcium chloride in the presence of a small quantity of the petroleum fraction, which boils at 180–220°. After the salt and solvent have been removed, a red pigment, which has a high color strength and good light, heat, overpainting, and migration fastness properties, is obtained.

When the 2,5-dibromo-3,6-bis(benzoylamino)-1,4-benzoquinone is replaced by 21.4 parts of 2,5-dibromo-3,6-bis(2'-methylbenzoylamino)-1,4-benzoquinone or by 21.4 parts of 2,5-dibromo-3,6-bis - (4'-methylbenzoylamino)-1,4-benzoquinone or by 22.9 parts of 2,5-dibromo-3,6-bis-(2'-chlorobenzoylamino) - 1,4-benzoquinone and the process is otherwise carried out as indicated above, then the following red pigments are obtained: the 2,6-dimethoxy-9,10-bis-(2' - methylbenzoylamino) - triphenyldioxazine; the 2,6-dimethoxy-9,10-bis-(4'methylbenzoylamino)-triphenyldioxazine; or the 2,6-dimethoxy - 9,10-bis-(2'-chlorobenzoylamino)-triphenyldioxazine. These pigments have properties which are as good as the 2,6-dimethoxy-9,10-bis-(benzoylamino)-triphenyldioxazine.

The 2,5-dibromo-3,6-bis - (benzoylamino) - 1,4-benzoquinone employed are orange-brown compounds which are sparingly soluble in conventional organic solvents. They are obtained by means of oxidation of the relevant 3,6-bis-(benzoylamino) - 1,4 - dimethoxy benzenes with nitric acid in glacial acetic acid, by subsequent bromination of 3,5 - bis - (benzoylamino) - 1,4 - benzoquinones formed with bromine in chloroform-2,5-dibromo-3,6-bis-(benzoylamino)-1,4-hydroquinones being formed and by further treatment with nitric acid in glacial acetic acid.

Example 87.—2-bromo-5-chloroacetylamino-1,4-benzoquinone 15 parts of 1,4-dimethoxy-2-bromo - 5 - chloroacetyl-amino-benzene are stirred into 250 parts by volume of glacial acetic acid at 20° C. 30 parts of dry sodium bichromate are added thereto within 15 minutes. The reaction mixture in then cooled, and 250 parts of cold water are added thereto, thereby precipitating the final product which is then separated by filtration. The yield is about 40% of the theoretical one. The 2-bromo-5-acetylamino-benzoquinone thus obtained is distinguished by fungicidal activity (M.P. 154.8°).

The above-described starting material is produced in a conventional manner by first acetylating the amino group of 1,4-dimethoxy - 2 - amino-benzene and subsequently brominating the 5-position of the resulting intermediate.

In an analogous manner, there are produced from the corresponding starting materials, the compounds falling under Formulas VII–A/C supra, in which Cl is replaced by bromine and $Y_1$, $Y_2$ and $R_{10}$ have the meaning given in Table V below.

TABLE V.

| Example: | $R_{10}$ | Y | $Y_2$ | M.P. (° C.) |
|---|---|---|---|---|
| 88 | —CH$_2$CH$_3$ | H | H | |
| 89 | —CHCl$_2$ | H | H | 165 |
| 90 | —CCl$_3$ | H | H | 215 |
| 91 | —C$_5$H$_{11}$ | H | H | 146 |
| 92 | —OC$_2$H$_5$ | H | H | 93 |
| 93 | —OC$_{10}$H$_{21}$ | H | H | 68–70 |
| 94 | —CH$_2$Cl | Br | Br | 210–215 |
| 95 | —CHCl$_2$ | Br | Br | 215–217 |
| 96 | —CCl$_3$ | Br | Br | 195–198 |
| 97 | —C$_5$H$_{11}$ | Br | Br | 162–163 |
| 98 | —OC$_2$H$_5$ | Br | Br | 136–137 |
| 99 | —OC$_{10}$H$_{21}$ | Br | Br | |

Fungicidal compositions according to the present invention containing as active ingredients compounds of the Formulas VII–A/C but wherein at least one of the radicals Y and $Y_1$ represents chlorine or bromine, have a fair to good fnngicidal activity, against at least four to all of the eight fungus species listed hereinbefore.

The compositions according to the invention are suitable for application in the most various fields. Because of their slight toxicity for warm blooded animals and almost complete lack of phytotoxicity in the normal concentrations for application, which vary between 0.01 to 2% calculated on the active ingredient, the compositions are particularly suitable for plant protection. They are used to inhibit and repress the growth of fungi on plants, parts thereof, for the disinfection of the soil, as well as for the protection of organic material of all types from attack and decomposition by fungi. Their use in fruit cultivation is of particular importance. In addition they can be used as dry seed dressings as they have an excellent action, e.g. on *Tilletia tritici, Fusarium culmorum* and many other fungi and do not inhibit germination of the seeds treated.

The compositions according to the invention are produced by thoroughly mixing or milling the active ingredients of the Formulas VII–A/C with suitable carriers in a known manner, with the optional addition of adhesives, dispersing agents or solvents which are inert to active ingredients. The following forms for application can be produced: dusts, strewing agents, granulates, wettable powders, pastes, emulsion concentrates, solutions (spray and mist), smokes and aerosols. The concentration of active ingredient in these forms for application is between 1 and 98%.

To produce dusts and sprinkling agents, as well as granulates, the active ingredients are thoroughly mixed with solid carriers such as, e.g. talcum, kaolin, bole, loess, chalk, ground limestone, diatomaceous earth, magnesium sulphate, ammonium sulphate, milled synthetic substances and fertilisers, in a concentration of 1–20%, calculated on the active ingredient. In order to attain a good distribution of the active substance on the carriers, it is necessary, particularly for granulates, to impregnate the carriers with melts or solutions of the active ingredient. For this purpose, particularly, easily volatile compounds such as hydrocarbons, their chlorinated derivatives, ketones, esters etc. are used as solvents. To improve the stability to rain and wind, adhesives such as, solid or liquid sulphite waste liquor, polyvinyl pyrrolidone, hydroxyethyl cellulose, etc. are added to the solid forms for application. To increase the stability to light, protective pigments, for example, are added.

Wettable powders, pastes, emulsion concentrates are obtained by mixing the active ingredients and solid or liquid carriers together with capillary active substances such as wetting agents, dispersing agents, protective colloids and adhesives.

Wetting agents used for these forms of application of the compositions according to the invention are the usual commercial products, e.g. alkali metal salts and alkaline earth metal salts of alkylaryl sulphonic acids such as, dibutylnaphthalene sulphonic acid, and salts of sulphated fatty alcohols, e.g. hexadecanols, octadecenols and octadecanols, as well as condensation products of ethylene oxide and mono- or di-alkyl phenols, the alkyl radicals of which contain 7 to 15 carbon atoms, e.g. dioctyl phenol and nonyl phenol condensates containing at least 8 ethylene oxide groups, polyethylene glycols containing 20–80 ethylene oxide groups; examples of adhesives are: pulverulent and liquid sulphite waste liquor, hydroxyethyl cellulose, polyvinyl pyrrolidone, highly viscous mineral oils, glue and synthetic substances; dispersing or emulsifying agents are: quaternary ammonium compounds having lipophilic radicals, morpholine derivatives, alkali, ammonium amine, and alkaline earth salts of sulpho-fatty acid esters of medium to higher alkanols, sulphated higher alkyl alkanolamines having at least 8 carbon atoms in the higher alkyl radical, polyethylene glycol ethers of fatty alcohols (e.g. of hexadecanol, octadecenol and octadecanols) or of alkyl phenols (e.g. dioctyl phenol and nonyl phenol), polycondensation products of ethylene oxide with propylene oxide (20–80 alkylene oxide groups), sugar, and water soluble cellulose derivatives.

For the wettable powders, the active ingredients, in the finest distribution, are drawn with the additives mentioned onto solid carriers such as, e.g. talcum, kaolin, bole, loess, chalk, ground limestone, diatomaceous earth, milled synthetic substances. These powders have a particle size of, for example, 20–40μ which is attained by repeated milling, mixing and sieving of the finished concentrates. For emulsion concentrates and pastes, in particular liquid carriers such as water and organic solvents, e.g. alcohols, benzene, xylenes, toluenes, dimethyl sulphoxide, dimethyl formamide, mineral oil fractions boiling in the range of 120 to 180°, as well as liquid sulphite waste liquor, are used. In choosing the solvents, care should be taken that they have practically no smell, are not phytotoxic, are inert to the active ingredients and are not easily combustible. The active ingredients are so mixed, milled, sieved and strained with the additives mentioned that, for example, in pastes, the particle size of the solids is not more than 3μ.

In addition, these forms for application contain additives to increase the stability to rain and light as described for the dusts and sprinkling agents. Also, they contain additives which facilitate the adhesion to the substrate and thus facilitate the penetration into the substrate. Examples of such additives are vegetable, animal and mineral oils.

The wettable powders, pastes and emulsion concentrates are diluted with water to the concentrations for practical application which are between 0.01 and 2%, calculated on the active ingredient. In the composition and concentrations for application described, the wettable powders have a good total suspension power which can be improved, e.g. by the addition of synthetic, voluminous silicic acid. The emulsifiability of the emulsion concentrates is also very good.

The agents according to the invention are also used in the form of solutions or sprays. For this purpose, the active ingredient(s) of the general Formula I are dissolved in suitable organic solvents, mixtures of solvents or in water. Higher aliphatic and aromatic hydrocarbons, their chlorinated derivatives, alkylnaphthalenes, or mixtures thereof alone or with water are used as organic solvents. The solutions contain the active ingredients in a concentration of 1–20%. They are applied as sprays and mist with suitable apparatus under pressure.

Aerosols are produced from solutions of the active ingredients by the addition of propellant gases which are suitable, in particular, for use indoors and in the garden. Both the solvent as well as the propellant gas can be the carrier for this form of application. Both the solutions as well as the aerosols contain additives to improve the adhesive power, the stability to rain and light and vegetable, animal and mineral oils to improve the adhesion and penetration power.

The forms for application of the agents according to the invention can be mixed very well with other biocidally active compounds or agents which contain such compounds. Thus, other biocidal active ingredients such as insecticides, other fungicides, bactericides, fungistatica, bacteriostatica or nematocides can be admixed to improve the range of action of the agents according to the invention. The agents according to the invention can also contain fertilisers, plant hormones etc.

The following non-limitative examples illustrate the production of compositions according to the invention.

Example I 2 parts of 5-n-propoxycarbonyl-amino-2-chloro-1,4-benzoquinone are milled with 98 parts of talcum. The dust so obtained can be used, for example, for the disinfection of soil in seed beds as well as for the dusting of plants and parts thereof such as bulbs or tubers.

Example II 15 parts of 5-acetylamino-3,6-dibromo-2-chloro-1,4-benzo-quinone are milled with 10 parts of an adhesive, e.g. a condensation product of ethylene oxide and nonylphenol containing 8 to 12 ethylene oxide groups, and 75 parts of talcum. A fungicidally active, non-toxic dust is obtained which can be used as a dry seed dressing. It does not influence germination.

Example III 50 parts of 5-ethoxycarbonylamino-3,6-dibromo-2-chloro-1,4-benzoquinone in the finest distribution are mixed and milled in suitable apparatus with 1 part of the sodium salt of dibutylnaphthalene sulfonic acid, 4 parts of pulverised sulphite waste liquor, 1 part of 50% hydroxyethyl cellulose on Champagne chalk and 44 parts of Champagne chalk. A 50% wettable powder (calculated on the active ingredient) is obtained. Suspensions of any concentration desired can be produced therefrom by the addition of water. The wetting power of this powder is good and the total suspension power is 61%.

Example IV 50 parts of 5-ethoxycarbonylamino-3,6-dibromo-2-chloro-1,4-benzoquinone in the finest distribution are mixed, milled and again mixed in suitable apparatus with 1 part of the sodium salt of dibutylnaphthalene sulfonic acid, 10 parts of sulfite waste liquor (pulverised), 2 parts of 50% hydroxyethyl cellulose on Champagne chalk, 10 parts of synthetic voluminous silicic acid and 27 parts of Champagne chalk. A 50% wettable powder is obtained which has a better total suspension power (78%) than the wettable powder described in Example III.

Example V 50 parts of 5-methoxycarbonylamino-3,6-dibromo-2-chloro-1,4-benzoquinone, 2 parts of polyvinyl alcohol as adhesive, 10 parts of sulphite waste liquor (pulverised), 16 parts of Champagne chalk, 20 parts of kaolin and 2 parts of the sodium salt of dibutylnaphthalene sulfonic acid as wetting agent, are milled, mixed and again milled together. A 50% wettable powder is obtained which can be suspended with water to any desired concentration. The suspension obtained can be used in fruit plantations.

Example VI

On milling together 10 parts of 5-chloroacetylamino-3,6-dibromo-2-chloro-1,4-benzoquinone and 82 parts of kaolin or chalk and mixing with 8 parts of wetting and dispersing agents, e.g. 8 parts of sulphite waste liquor (pulverised), a concentrate is obtained which, on mixing with water, produces a fungicidal spray which is excellently suitable for the treatment of all parts of plants above the soil.

Example VII 20 parts of 5-chloroacetylamino-3,6-dibromo-2-chloro-1,4-benzoquinone are finely milled in a ball mill with 4 parts of a polyvinyl pyrrolidone as dispersing agent and 76 parts of water. The paste obtained is suspended in water and can be used for the combatting of fungi, particularly in fruit cultivation.

Example VIII 50 parts of 5-chloroacetylamino-2-chloro-1,4-benzoquinone are mixed with 10 parts of liquid sulphite waste liquor and 40 parts of water and the mixture is milled in a ball mill or passed through a rolling mill several times whereupon a 50% wettable paste is obtained the particle size of which is less than 3μ. 0.1% to 0.5% suspensions of such pastes in water can be used to combat fungi, in particular in fruit cultivation.

Example IX 10 parts of 5-hexanoylamino-3,6-dibromo-2-chloro-1,4-benzoquinone are dissolved in 15 parts of dimethyl sulfoxide and 65 parts of cyclohexanone. 10 parts of sodium salt of dibutylnaphthalene sulfonic acid are mixed into this solution until homogeneity is attained. An emulsifiable solution is obtained which can be diluted to any concentration desired.

Example X 10 parts of 5-(β-chloropropionylamino)-3,6-dibromo-2-chloro-1,4-benzoquinone are dissolved in 80 parts of dimethyl formamide and 10 parts of the sodium salt of dibutylnaphthalene sulfonic acid are mixed into the solution until homogeneity is attained. In this way an emulsifiable solution is obtained which can be diluted to any concentration desired.

Fungicidal activity of the compounds of Formulas VII–A to –C, supra, was especially strong, as confirmed by germination test on spores, against at least three out of eight species of fungi:

*Alternaria tenuis, Botrytis cinerea, Clasterosporium c., Coniothyrium dipl., Fusarium culm.,* Mucor spec., Penicillium spec., *Stemphylium cons.*

In this test a standard amount of a 1%- a 0.1%- and a 0.01%-acetonic solution of the substance to be tested for fungicidal activity was applied under identical conditions to four petri dishes containing nutrient medium of equal surface area. The solvent was evaporated and a uniform active coating of the active substance, on the nutrient base, ready for inoculation was thus obtained in each of the four dishes. Each dish was then inoculated with an equal amount of spores and the inoculated dishes were kept at room temperature for a standard time of between 2 and 6 days in an atmosphere having a moisture content of above 90% (close to saturation). The germinated spores were then counted. Very good results were obtained, particularly with the following compounds which showed a 95% inhibition of germination in *Botrytis cinerea, Clasterosporium c.* and *Coniothyrium dipl.,* when used in a concentration of only 0.01%:

2-chloro-5-carbethoxyamino-3,6-dibromo-1,4 - benzoquinone 2-chloro-5-carbomethoxyamino-3,6-dibromo - 1,4-benzoquinone 2-chloro-5-chloroacetamino - 3,6 - dibromo - 1,4-benzoquinone The following table shows the results of these tests.

| Compound | Alt. ten. | Botr. cin. | Clast. c. | Conioth dipl. | Fus. culm. | Muc. spec. | Penic. spec. | Stemph. cons. |
|---|---|---|---|---|---|---|---|---|
| 2-chloro-acetylamino-5-bromo-1,4-benzoquinone | o | o | o | o | o | o | o | o |
| 5-chloroacetylamino-2-chloro-1,4-benzoquinone | + | + | + | + | + | o | -o | o |
| 2-acetylamino-5-bromo-1,4-benzoquinone | o | o | o | o | o | o | o | o |
| 2-acetylamino-5-chloro-1,4-benzoquinone | o | o | o | o | + | o | o | o |
| 5-nonanoylamino-2-chloro-1,4-benzoquinone | o | + | + | + | o | o | o | o |
| 2-chloroacetylamino-3,5,6-tribromo-1,4-benzoquinone | o | o | o | o | o | o | o | o |
| 5-chloracetylamino-3,6-dibromo-2-chloro-1,4-benzoquinone | ++ | ++ | ++ | ++ | + | ++ | ++ | + |
| 2-acetylamino-3,5,6-tribromo-1,4-benzoquinone | o | + | + | o | o | o | o | o |
| 5-acetylamino-3,6-dibromo-2-chloro-1,4-benzoquinone | + | ++ | ++ | ++ | ++ | ++ | + | + |
| 5-n-propoxycarbonylamino-2-chloro-1,4-benzoquinone | + | + | + | + | + | + | + | + |
| 5-methoxycarbonylamino-3,6-dibromo-2-chloro-1,4-benzoquinone | + | ++ | ++ | ++ | + | + | + | ++ |
| 5-ethoxycarbonylamino-3,6-dibromo-2-chloro-1,4-benzoquinone | + | + | ++ | + | + | + | + | + |
| 5-(β-chloropropionylamino)-3,6-dibromo-2-chloro-1,4-benzoquinone | + | + | + | + | + | + | + | + |
| 5-hexanoylamino-3,6-dibromo-2-chloro-1,4-benzoquinone | + | + | o | + | + | o | + | + |
| 5-(p-chlorobenzoylamino)-3,6-dibromo-2-chloro-1,4-benzoquinone | + | + | + | + | + | o | o | o |
| 5-phenylacetylamino-3,6-dibromo-2-chloro-1,4-benzoquinone | + | + | + | + | + | + | o | o |

The sign "+" in the foregoing table shows an at least 90% inhibition of germination effected by the residue of 1 ccm. of a 0.1% acetone solution of the active ingredient (which concentration corresponds to 1.3γ of active substance per square centimeter); "++" shows an at least 90% inhibition of germination attained by the residue of 1 ccm. of a 0.01% acetone solution of active ingredient. "o" Signifies an activity against the respective fungi requiring a concentration of 1% or more of active ingredient in the used test solution and therefore generally insufficient for practical application. The concentration is given in percent calculated on the weight of the acetonic solution of the test compound.

We claim:

1. A process for the production of a compound of the formula

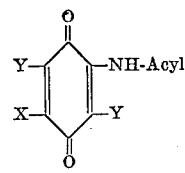

wherein Acyl is a member selected from the group consisting of an unsubstituted alkanoic acyl radical, a chloroalkanoic acyl radical, a bromo-alkanoic acyl radical, an alkoxy-alkanoic acyl radical, a cycloalkanoic acyl radical, an aralkanoic acyl radical, a benzoic acyl radical, a naphthoic acyl radical, and an alkoxy carbonyl radical.

X is a member selected from the group consisting of —NH-Acyl, chlorine and fluorine, and
Y is a member selected from the group consisting of chlorine and bromine, comprising
  (a) mixing a compound of the formula

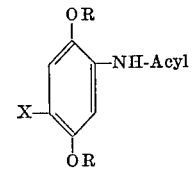

wherein X and Acyl have the aforesaid meanings, and
  R is a member selected from the group consisting of a lower alkyl, a benzyl and a phenyl radical, in a liquid inert to oxidation, with nitric acid having a strength of at least 0.5-normal, at a temperature of about 10° to 100° C., thereby oxidizing the last-mentioned compound to a compound of the formula

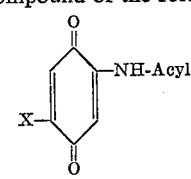

wherein Acyl and X have the aforesaid meanings,
  (b) separating the latter compound from the reaction mixture;
  (c) mixing the aforesaid compound of Formula III in an organic solvent inert to halogenation, with a halogenating agent selected from the group consisting of bromine and chlorine at about 0° to 200° C., thereby halogenating the compound of Formula III to a compound of the Formula IV, and
  (d) separating the latter compound from the reaction.

2. A process as described in claim 1, wherein step (c) is carried out with bromine as halogenating agent in a solvent selected from the group consisting of chloroform, dichlorobenzene and glacial acetic acid.

3. A process as described in claim 1 wherein step (c) is carried out in the presence of a solvent selected from the group consisting of glacial acetic acid, chloroform, carbon tetrachloride, tetrachloroethane, chlorobenzenes and nitrobenzene.

4. A process according to claim 1 wherein step (a) is carried out in the presence of glacial acetic acid as the liquid medium.

5. A process according to claim 1 wherein step (c) is carried out in the presence of glacial acetic acid as the solvent.

6. A process for the production of a compound of the formula

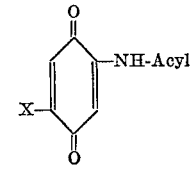

wherein

Acyl is a member selected from the group consisting of an unsubstituted alkanoic acyl radical, a chloro-alkanoic acyl radical, a bromo-alkanoic acyl radical, an alkoxyalkanoic acyl radical, a cyclo-alkanoic acyl radical, an aralkanoic acyl radical, a benzoic acyl radical, a naphthoic acyl radical, a pyridinocarboxylic acyl radical, an alkoxy carbonyl radical, and X is a member selected from the group consisting of —NH-Acyl, chlorine and fluorine, comprising mixing a compound of the formula

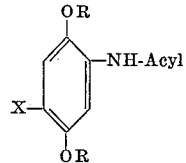

(II)

wherein X and Acyl have the aforesaid meanings, and R is a lower alkyl, a benzyl and a phenyl radical in a liquid inert to oxidation with nitric acid having a strength of at least 0.5-normal, at a temperature of about 10° to 100°, thereby oxidizing the last-mentioned compound of Formula II to the compound of Formula III and recovering the latter from the reaction mixture.

7. A compound of the formula

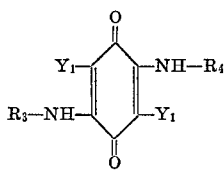

wherein $Y_1$ is a member selected from the group consisting of chlorine and bromine, and each of $R_3$ and $R_4$ is, independently, a member selected from the group consisting of an aralkanoic acyl radical of maximally 10 carbon atoms, an aromatic carbocyclic hydrocarbon carboxylic acyl radical with maximally 12 carbon atoms.

8. A compound of the formula

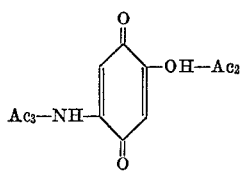

wherein each of $Ac_2$ and $Ac_3$ is, independently, a member selected from the group consisting of a chloro-alkanoic acyl radical with maximally 4 carbon atoms, a bromo-alkanoic acyl radical with maximally 4 carbon atoms, an alkoxy-alkanoic acyl radical with maximally 10 carbon atoms, a cyclo-alkanoic acyl radical with 6 to 7 carbon atoms, an aralkanoic acyl radical with maximally 10 carbon atoms, a naphthoic acyl radical with maximally 12 carbon atoms, a pyridinocarboxylic acyl, and a lower alkoxy carbonyl radical.

9. A compound of the formula

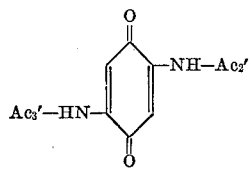

wherein $Ac_2'$ is benzoyl and $AC_3'$ is lower alkanoyl.

10. A compound of the formula

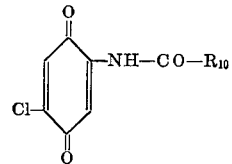

wherein $R_{10}CO$— is a member selected from the group consisting of unsubstituted alkanoic acyl of from 3 to 10 carbon atoms,
mono- to tri-chloro-, mono- to tri-bromo- and mono- to tri-fluorosubstituted alkanoic acyl, of from 2 to 19 carbon atoms, phenyl-carbonyl, chloro-phenyl carbonyl, bromo-phenyl carbonyl, trifluoromethyl-phenyl carbonyl, lower alkyl-phenyl carbonyl, lower alkoxy-phenyl carbonyl, nitro-phenyl carbonyl, cinnamoyl and cinnamylcarbonyl.

11. A compound of the formula

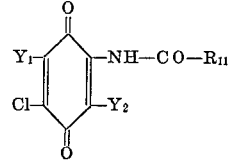

wherein each of $Y_1$ and $Y_2$ is a member selected from the group consisting of bromine and chlorine, and $R_{11}$—CO— is a member selected from the group consisting of unsubstituted alkanoic acyl of from 2 to 19 carbon atoms,
mono- to tri-chloro-, mono- to tri-bromo- and mono- to tri-fluorosubstituted alkanoic acyl, of from 2 to 19 carbon atoms, phenyl carbonyl, chloro-phenyl carbonyl, bromo-phenyl carbonyl, trifluoromethyl-phenyl carbonyl, lower alkyl-phenyl carbonyl, lower alkoxy-phenyl carbonyl, nitro-phenyl carbonyl, cinnamoyl and cinnamylcarbonyl.

12. A compound of the formula

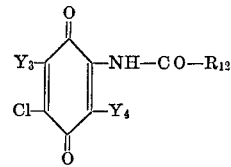

each of $Y_3$ and $Y_4$ is a member selected from the group consisting of
hydrogen, chlorine and bromine, and
$R_{12}$—CO— is a member selected from the group consisting of
alkoxycarbonyl of from 2 to 13 carbon atoms, chloro-, bromo- and fluoro-substituted alkoxycarbonyl, of from 3 to 13 carbon atoms, at least two carbon atoms being present intermediate the aforesaid halogen substituent and the —CO— moiety of the $R_{12}$—CO group;
alkoxy-substituted alkylcarbonyl, having a total of from 3 to 19 carbon atoms,
alkoxy-substituted alkoxy-carbonyl having a total of from 3 to 19 carbon atoms, at least two carbon atoms being present in the alkoxy bridge intermediate the terminal alkoxy-substituent and the —CO— moiety of the $R_{12}$—CO— group, phenoxy-carbonyl, chloro-phenoxy-carbonyl, bromo-phenoxy-carbonyl, nitro-phenoxy-carbonyl, trifluoromethyl-phenoxy-carbonyl, lower alkyl-phenoxy-carbonyl and lower alkoxy-phenoxy-carbonyl, and cinnamyloxy-carbonyl.

(References on following page)

References Cited

UNITED STATES PATENTS

| | | | |
|---|---|---|---|
| 3,130,195 | 4/1964 | Vonder Crone et al. | 260—246 |
| 3,036,071 | 5/1962 | Frey et al. | 260—246 |
| 2,923,657 | 2/1960 | Dost et al. | 167—30 |
| 2,919,226 | 12/1959 | Levi | 167—30 |

FOREIGN PATENTS

| | | |
|---|---|---|
| 292,176 | 5/1916 | Germany. |

OTHER REFERENCES

Treatise On Inorganic Chemistry, H. Remy, vol. 1 (1956), Elsevier Publishing Co., p. 761 relied on.

LORRAINE A. WEINBERGER, *Primary Examiner.*

L. A. THAXTON, *Assistant Examiner.*

U.S. Cl. X.R.

260—246, 295, 471, 553, 556, 562; 424—324